(12) United States Patent
Navarro et al.

(10) Patent No.: US 11,978,090 B2
(45) Date of Patent: May 7, 2024

(54) METHOD AND SYSTEM FOR SENDING BIOMETRIC DATA BASED INCENTIVES

(71) Applicant: The Toronto-Dominion Bank, Toronto (CA)

(72) Inventors: Miguel Navarro, Ewing, NJ (US); Mathew Hause, Collingswood, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/168,267

(22) Filed: Feb. 5, 2021

(65) Prior Publication Data

US 2022/0253905 A1    Aug. 11, 2022

(51) Int. Cl.
*G06Q 30/02* (2023.01)
*G06N 20/00* (2019.01)
*G06Q 30/0251* (2023.01)

(52) U.S. Cl.
CPC ......... *G06Q 30/0271* (2013.01); *G06N 20/00* (2019.01); *G06Q 30/0261* (2013.01)

(58) Field of Classification Search
None
See application file for complete search history.

(56) References Cited

U.S. PATENT DOCUMENTS

| | | | |
|---|---|---|---|
| 8,442,849 B2 | 5/2013 | Kantak et al. | |
| 9,836,756 B2 | 12/2017 | Rider et al. | |
| 9,891,792 B1 * | 2/2018 | Morin | G06N 20/00 |
| 10,380,618 B2 | 8/2019 | Zhang | |
| 10,558,862 B2 | 2/2020 | Sanjay et al. | |
| 10,832,283 B1 * | 11/2020 | Angelopoulos | G06N 20/00 |
| 10,878,062 B1 * | 12/2020 | Garavaglia | G16H 40/60 |
| 10,878,454 B2 * | 12/2020 | Appakutty | G06Q 30/0261 |
| 11,115,409 B2 * | 9/2021 | Shattuck | G06N 3/084 |
| 11,195,619 B2 * | 12/2021 | Baughman | G06N 20/00 |
| 11,373,446 B1 * | 6/2022 | Beisel | G06V 40/12 |
| 2006/0293921 A1 * | 12/2006 | McCarthy | A61B 5/6815 705/2 |
| 2014/0324749 A1 * | 10/2014 | Peters | G09B 7/04 706/46 |

(Continued)

OTHER PUBLICATIONS

Incentive Mechanisms for Participatory Sensing: Survey and Research Challenges, Restuccia et al., arXiv:1502.07687v3 [cs.GT] Apr. 27, 2015.*

(Continued)

*Primary Examiner* — David J Stoltenberg
(74) *Attorney, Agent, or Firm* — Rowand LLP

(57) ABSTRACT

A computer server system comprises a communications module; a processor coupled with the communications module; and a memory coupled to the processor and storing processor-executable instructions which, when executed by the processor, configure the processor to receive, via the communications module and from one or more devices, a signal including biometric data of a user; analyze the biometric data to predict an emotional state of the user; determine that the predicted emotional state of the user satisfies predefined criteria; and responsive to determining that the predicted emotional state of the user satisfies the predefined criteria, send via the communications module to the one or more devices a signal including one or more incentives based on the predicted emotional state.

18 Claims, 11 Drawing Sheets

(56) References Cited

U.S. PATENT DOCUMENTS

| | | | | |
|---|---|---|---|---|
| 2015/0348162 | A1* | 12/2015 | Morris | G06Q 30/0631 |
| | | | | 705/26.7 |
| 2016/0170998 | A1* | 6/2016 | Frank | G06F 16/337 |
| | | | | 707/748 |
| 2017/0031449 | A1 | 2/2017 | Karsten et al. | |
| 2017/0192994 | A1* | 7/2017 | Hong | G06F 16/164 |
| 2018/0005272 | A1* | 1/2018 | Todasco | G06Q 30/0269 |
| 2018/0150130 | A1 | 5/2018 | Fowler et al. | |
| 2018/0225683 | A1 | 8/2018 | Gromada et al. | |
| 2018/0276710 | A1* | 9/2018 | Tietzen | G06Q 30/0269 |
| 2019/0122295 | A1* | 4/2019 | Chu | G06V 40/10 |
| 2021/0005224 | A1* | 1/2021 | Rothschild | H04N 9/8205 |
| 2021/0019757 | A1* | 1/2021 | Bermudez | G06N 3/0454 |
| 2021/0125262 | A1* | 4/2021 | Corrieri | G06Q 30/0601 |
| 2021/0212581 | A1* | 7/2021 | Kim | A61B 5/6898 |
| 2021/0224828 | A1* | 7/2021 | Ogrinz | G06Q 30/0201 |
| 2021/0390581 | A1* | 12/2021 | Chan | G06V 20/597 |
| 2022/0318791 | A1* | 10/2022 | Ballenger | G06F 9/44526 |
| 2023/0142625 | A1* | 5/2023 | Lawrence | A61B 5/167 |
| | | | | 706/12 |
| 2024/0013256 | A1* | 1/2024 | Hashimoto | G06Q 30/0261 |

OTHER PUBLICATIONS

A deep learning-based system to track and analyze customer behavior in retail store, Generosi et al., 2018 IEEE 8th International Conference on Consumer Electronics—Berlin (ICCE-Berlin).*

A Review of Emotion Recognition Methods Based on Data Acquired via Smartphone Sensors, Kołakowska et al., Sensors 2020, 20, 6367; oi: 10.3390/s20216367.*

Method and System to Serve Sentiment Enabled Ads Based upon User's Dynamic Emotion; Rohit Sharma; IPCOM000222453D IP.com Electronic Publication Date: Oct. 9, 2012.*

Method and System for Adjusting Price of Goods or Services based on Emotional State of a Consumer, IPCOM000241786D IP.com Electronic Publication Date: Jun. 1, 2015.*

AMYX: "Wearables Gushing Emotions: A new brand-engagement architecture", IEEE Consumer Electronics Magazine (vol. 4, Issue: 1, Jan. 2015), pp. 87-89, published on Dec. 18, 2014.

* cited by examiner

METHOD AND SYSTEM FOR SENDING BIOMETRIC DATA BASED INCENTIVES

TECHNICAL FIELD

The present application relates to methods and systems for sending biometric data based incentives.

BACKGROUND

Willingness to spend money is often related to a customer's emotional state. For example, a customer may be more willing to spend money when they are happy or in a good mood.

It is difficult for merchants to predict an emotional state of a user without communicating directly with them. As such, merchants may miss the opportunity to provide incentives to their customers when they are in the mood to shop or spend money.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
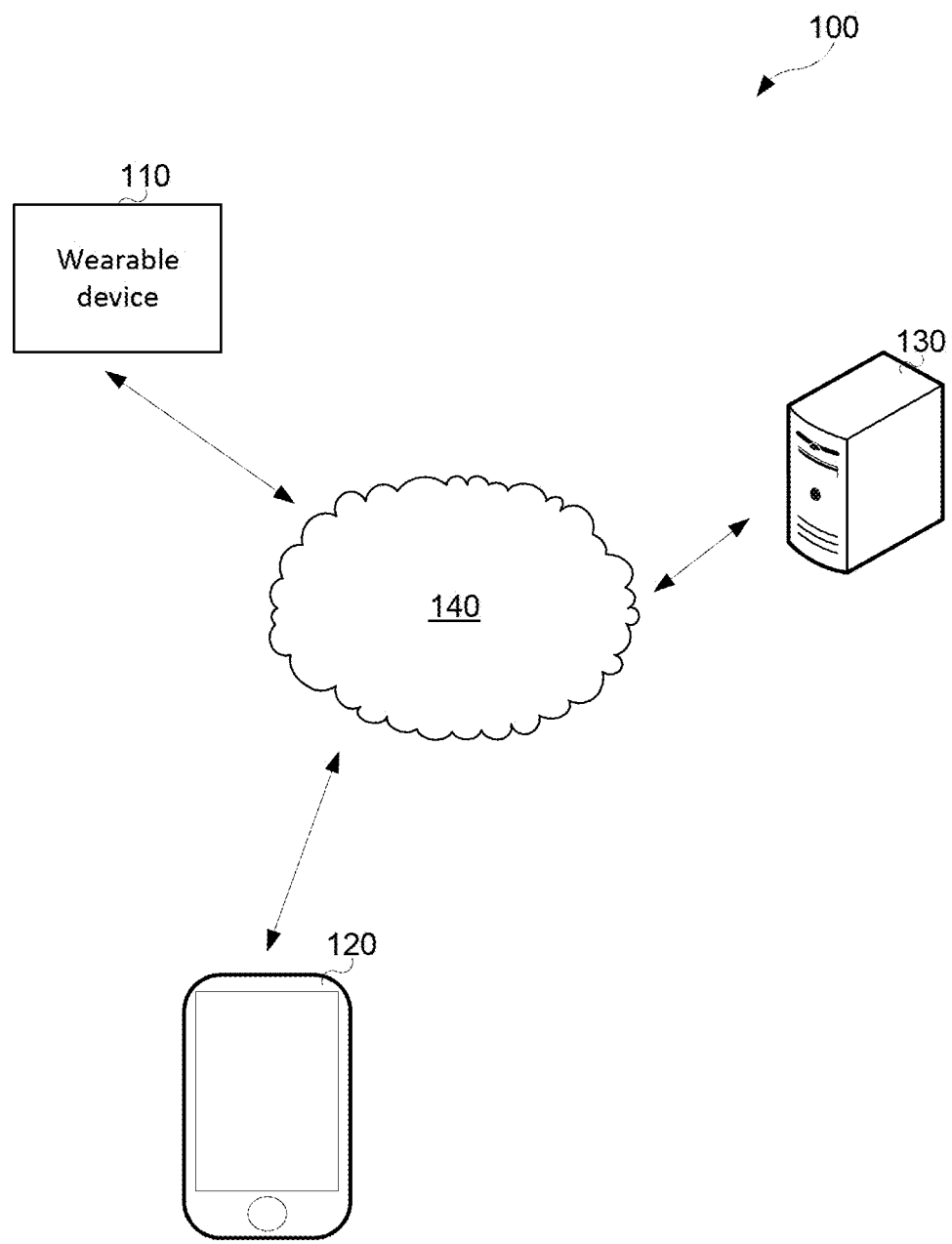
FIG. 1 is a schematic operation diagram illustrating an operating environment of an example embodiment.

In one aspect there may be provided a computer server system comprising a communications module; a processor coupled with the communications module; and a memory coupled to the processor and storing processor-executable instructions which, when executed by the processor, configure the processor to receive, via the communications module and from one or more devices, a signal including biometric data of a user; analyze the biometric data to predict an emotional state of the user; determine that the predicted emotional state of the user satisfies predefined criteria; and responsive to determining that the predicted emotional state of the user satisfies the predefined criteria, send via the communications module to the one or more devices a signal including one or more incentives based on the predicted emotional state.

In one or more embodiments, the processor-executable instructions, when executed by the processor, further configure the processor to repeat the steps of receiving and analyzing to identify a change in the emotional state of the user; and responsive to identifying the change in the emotional state of the user, send the signal including the one or more incentives.

In one or more embodiments, the processor-executable instructions, when executed by the processor, further configure the processor to receive, via the communications module and from the one or more devices, a signal including location data identifying a location of the user; determine that the change in emotional state is a result of a change in location of the user; and responsive to determining that the change in emotional state is the result of the change in location of the user, send the signal including the one or more incentives.

In one or more embodiments, the processor-executable instructions, when executed by the processor, further configure the processor to obtain, via the communications module and from a server, transaction data indicating transactions made by the user; and identify at least one transaction associated with the change in the emotional state of the user, wherein the one or more incentives are further based on the identified transaction.

In one or more embodiments, when analyzing the biometric data to predict the emotional state of the user, the processor-executable instructions further configure the processor to engage an application programming interface to obtain data associated with the user; determine at least one average value based on the data associated with the user; and compare the biometric data to the at least one average value to predict the emotional state of the user.

In one or more embodiments, when analyzing the biometric data to predict the emotional state of the user, the processor-executable instructions further configure the processor to store the biometric data in memory; and compare current biometric data to previously obtained biometric data of the user to predict the emotional state of the user.

In one or more embodiments, the processor-executable instructions, when executed by the processor, further configure the processor to receive, via the communications module and from the one or more devices, a signal including location data indicating a location of the user; wherein the one or more incentives are further based on the location of the user.

In one or more embodiments, the processor-executable instructions, when executed by the processor, further configure the processor to after providing the one or more incentives to the user, receive a signal including additional biometric data of the user; and analyze the additional biometric data to determine an effect the one or more incentives had on the emotional state of the user.

In one or more embodiments, the processor-executable instructions, when executed by the processor, further configure the processor to after providing the one or more incentives to the user, obtain transaction data of the user; and analyze the transaction data to determine an effect the one or more incentives had on the emotional state of the user.

In one or more embodiments, the processor-executable instructions, when executed by the processor, further configure the processor to engage an artificial intelligence component to select the one or more incentives to be provided to the user, the artificial intelligence component trained to select the one or more incentives using previous transaction data from previous transactions and corresponding predicted emotional states.

According to another aspect there is provided a computer-implemented method of providing incentives to a user, the method comprising receiving, via a communications module and from one or more devices, a signal including biometric data of a user; analyzing the biometric data to predict an emotional state of the user; determining that the predicted emotional state of the user satisfies predefined criteria; and responsive to determining that the predicted emotional state of the user satisfies the predefined criteria, sending, via the communications module and to the one or more devices, a signal including one or more incentives based on the predicted emotional state.

In one or more embodiments, the method further comprises repeating the steps of receiving and analyzing to identify a change in the emotional state of the user; and responsive to identifying the change in the emotional state of the user, sending the signal including the one or more incentives.

In one or more embodiments, the method further comprises receiving, via the communications module and from the one or more devices, a signal including location data identifying a location of the user; determining that the change in emotional state is a result of a change in location of the user; and responsive to determining that the change in emotional state is the result of the change in location of the user, providing the signal including the one or more incentives.

In one or more embodiments, the method further comprises obtaining, via the communications module and from a server, transaction data indicating transactions made by the user; and identifying at least one transaction associated with the change in the emotional state of the user, wherein the one or more incentives are further based on the identified transaction.

In one or more embodiments, analyzing the biometric data to predict the emotional state of the user comprises engaging an application programming interface to obtain data associated with the user; determining at least one average value based on the data associated with the user; and comparing the biometric data to the at least one average value to predict the emotional state of the user.

In one or more embodiments, analyzing the biometric data to predict the emotional state of the user comprises storing the biometric data in memory; and comparing current biometric data to previously obtained biometric data of the user to predict the emotional state of the user.

In one or more embodiments, the method further comprises receiving, via the communications module and from the one or more devices, a signal including location data indicating a location of the user; wherein the one or more incentives are further based on the location of the user.

In one or more embodiments, the method further comprises after providing the one or more incentives to the user, obtaining transaction data of the user; and analyzing the transaction data to determine an effect the one or more incentives had on the emotional state of the user.

In one or more embodiments, the method further comprises engaging an artificial intelligence component to select the one or more incentives to be provided to the user, the artificial intelligence component trained to select the one or more incentives using previous transaction data from previous transactions and corresponding predicted emotional states.

According to another aspect there is provided a non-transitory computer readable storage medium comprising computer-executable instructions which, when executed, configure a processor to receive, via a communications module and from one or more devices, a signal including biometric data of a user; analyze the biometric data to predict an emotional state of the user; determine that the predicted emotional state of the user satisfies predefined criteria; and responsive to determining that the predicted emotional state of the user satisfies the predefined criteria, send, via the communications module and to the one or more devices, a signal including one or more incentives based on the predicted emotional state.

Some or all of the above features may be provided by some embodiments.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a system 100 which may be used, for example, to send biometric data based incentives. As shown, the system 100 includes a first computing device 110, a second computing device 120 and a server 130 coupled to one another through a network 140, which may include a public network such as the Internet and/or a private network.

The first computing device 110 may be a wearable device configured to obtain biometric data of a user. For example, the wearable device may be an electronic device or article (e.g. garments and accessories) having a wearable form factor. In some embodiments, the first computing device 110 may be a smartwatch, a fitness and health tracker, glasses, a ring, a bracelet, etc.

The second computing device 120 may take a variety of forms such as a smartphone, a tablet computer, a wearable computer such as a head-mounted display or smartwatch, a laptop or desktop computer, or a computing device of another type.

The first computing device 110 may be communicatively coupled with the second computing device 120. For example, the first computing device 110 may be communicatively coupled with the second computing device 120 via Bluetooth, near-field communication (NFC) or other form of short-range wireless communication.

The server 130 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The server 130 may be associated with a merchant and/or a financial institution and may be configured to generate one or more biometric data based incentives. In at least some embodiments, the server 130 is a value transfer server or financial institution server which may maintain customer bank accounts. That is, the server 130 may maintain a database that includes various data records. A data record may, for example, reflect an amount of value stored in a particular account associated with a user. The database may include transaction data indicating transactions made by the user.

The server 130 may additionally or alternatively be an application server associated with a mobile application that is resident on the first computing device 110 and/or the second computing device 120. For example, the server 130 may connect the second computing device 120 to a back-end system associated with the mobile application.

The first computing device 110 and/or the second computing device 120 may be adapted to present a graphical user interface that allows for communication with the server 130. For example, the first computing device 110 may be adapted to send, to the server 130, a signal including biometric data of a user and the second computing device 120 may be adapted to receive, from the server 130, a signal causing the second computing device 120 to display one or more biometric data based incentives.

The first computing device 110, the second computing device 120 and the server 130 may be in geographically disparate locations. Put differently, the first computing device 110, the second computing device 120 and the server 130 may be remote from one another.

The network 140 is a computer network. In some embodiments, the network 140 may be an internetwork formed of one or more interconnected computer networks. For example, the network 140 may be or may include an Ethernet network, an asynchronous transfer mode (ATM) network, a wireless network, a telecommunications network, or the like.

The server 130 may be adapted to perform one or more operations consistent with the disclosed embodiments.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
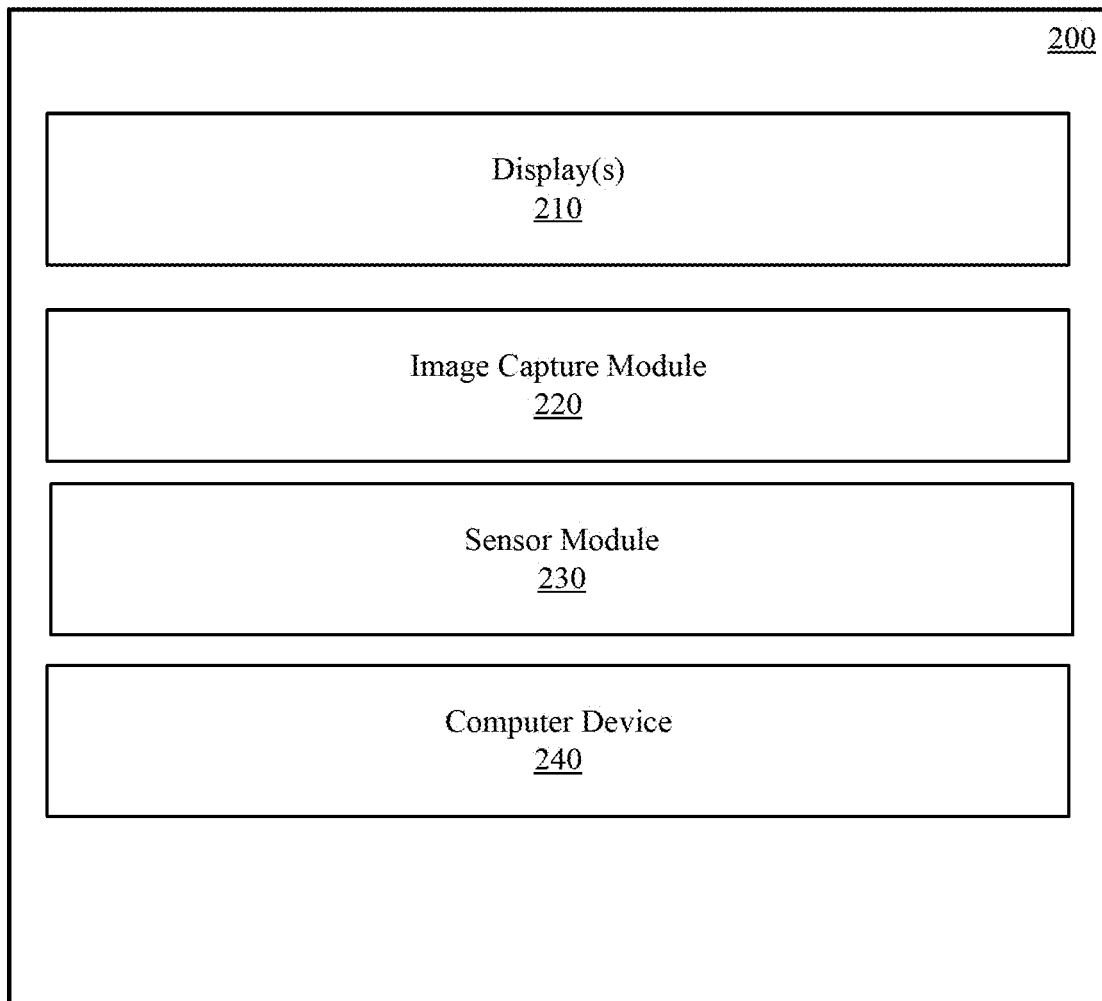
FIG. 2 is a simplified schematic diagram showing components of a computing device.

FIG. 2 is a simplified schematic diagram showing component of an exemplary computing device 200. The first computing device 110 and the second computing device 120 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server 130 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

By way of another example, the sensor module 230 may be or include a biometric subsystem which generates biometric data. For example, the sensor module 230 may include one or more optical sensors configured to measure the user's heart rate. Put another way, the sensor module 230 may generate biometric data identifying a heart rate of the user.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
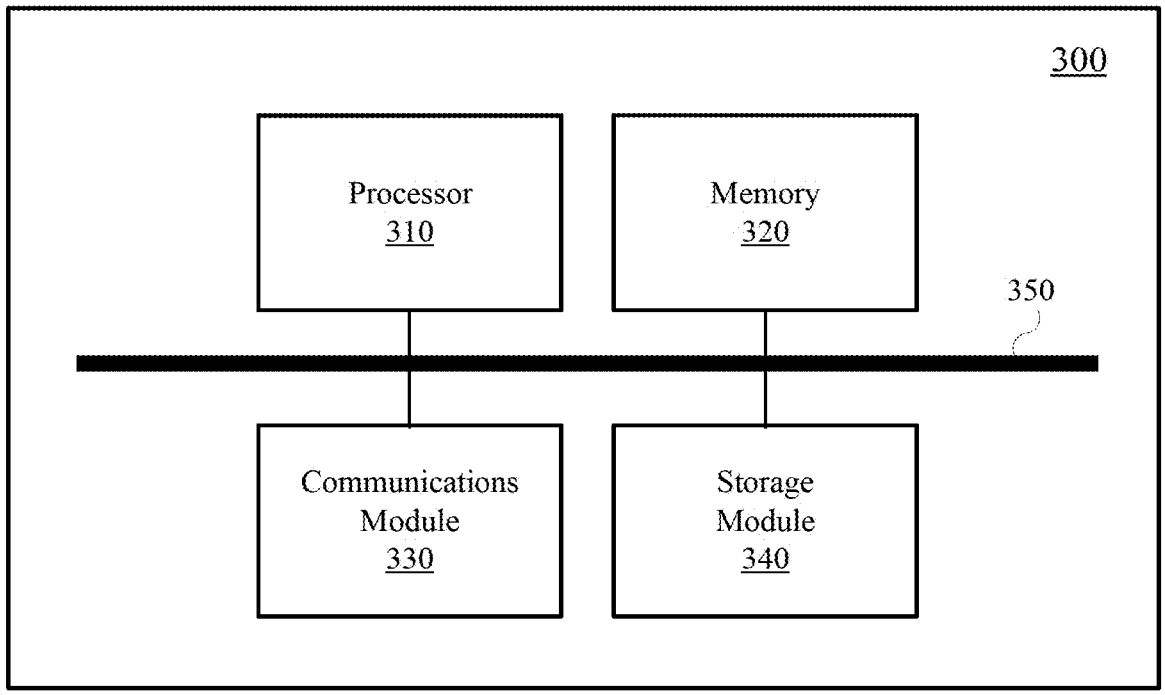
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and the server 130.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persisted storage of the memory 320. Additionally or alternatively, instructions may be executed by the processor 310 directly from read-only memory of the memory 320.

Figure 4:
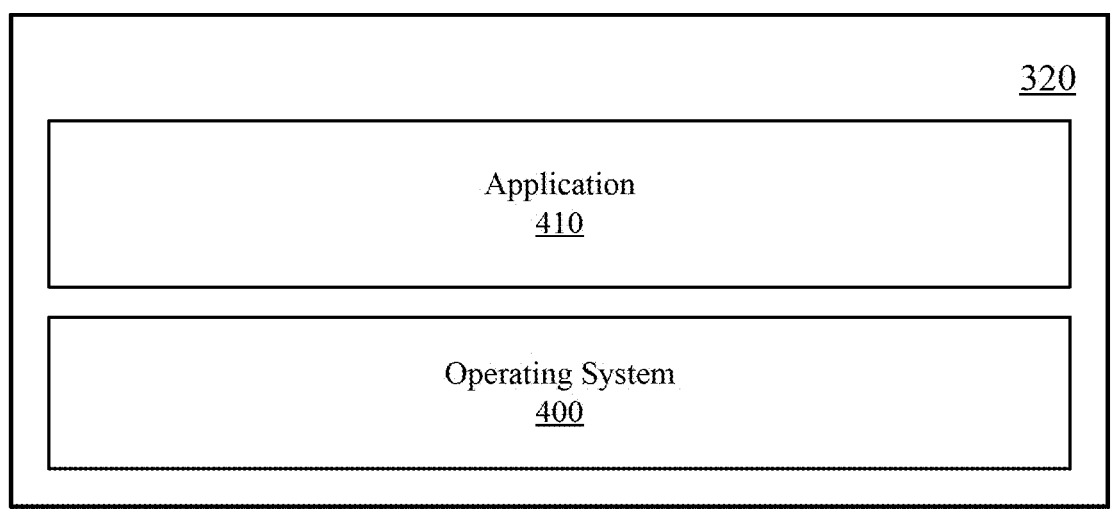
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server 130.

While a single application 410 is illustrated in FIG. 3, in operation the memory 320 may include more than one application 410 and different applications 410 may perform different operations.

For example, in at least some embodiments in which the computer device 300 functions as the first computing device 110 or the second computing device 120, the applications 410 may include an incentive application associated with a merchant and/or a financial institution. The incentive application may be configured for secure communications with the server 130 and may be used to provide biometric data based incentives to the user. For example, biometric data may be sent to the server 130 from the first computing device 110 or the second computing device 120. The server 130 may analyze the biometric data and, responsive to the biometric data satisfying predefined criteria, the server 130 may send a signal causing the first computing device 110 and/or second computing device 120 to display one or more incentives to the user.

By way of further example, in at least some embodiments in which the computer device 300 functions as the first computing device 110 or the second computing device 120, the applications 410 may include an electronic messaging application. The electronic messaging application may be configured to display a received electronic message such as an email message, short messaging service (SMS) message such as a text message, or a message of another type. In at least some embodiments, the server 130 may be configured, through computer-executable instructions, to send a message to the first computing device 110 or the second computing device 120. For example, the server 130 may be configured to send a SMS message to a phone number associated with a user and an electronic messaging application on the second computing device 120 may be configured to retrieve the message and display the message to the user. The message may include information associated with one or more biometric data based incentives.

Figure 5:
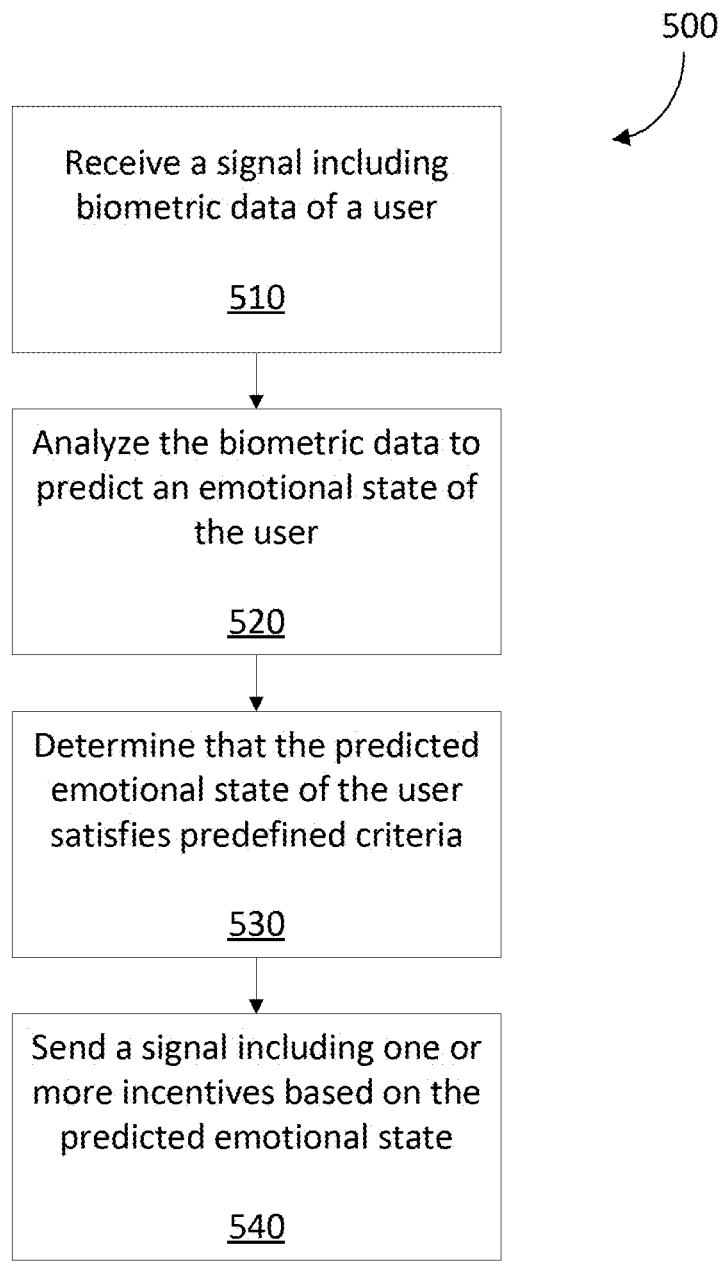
FIG. 5 is a flowchart showing operations performed by a server in sending biometric data based incentives according to an embodiment.

FIG. 5 is a flowchart showing operations performed by the server 130 in sending biometric data based incentives according to an embodiment. The operations may be included in a method 500 which may be performed by the server 130. For example, computer-executable instructions stored in memory of the server 130 may, when executed by one or more processors, configure the server 130 to perform the method 500 or a portion thereof.

The server 130 receives, via the communications module and from one or more devices, a signal including biometric data of a user (step 510). In this embodiment, the one or more devices include the first computing device 110 and/or the second computing device 120.

The biometric data may include data associated with a heart rate of the user. For example, the first computing device 110 may be a wearable device such as a smart watch. The first computing device 110 may obtain biometric data of the user using the one or more optical sensors of the sensor module. The first computing device 110 may send the biometric data of the user to the server 130.

It will be appreciated that the biometric data may include additional or alternative data such as for example data associated with blood pressure of the user, blood sugar level of the user, blood oxygen level of the user, fitness data such as the number of steps walked by the user, quality of sleep data, etc.

The server 130 analyzes the biometric data to predict an emotional state of the user (step 520). The predicted emotional state of the user may be, for example, happy, sad, active, lazy, excited, etc. The predicted emotional state of the user may be binary where the emotional state is one or the other (happy/sad). A baseline predicted emotional state of the user may be used and may be referred to as normal. For example, the user may be happy, sad, or normal (not happy and not sad).

In this embodiment, the biometric data may be compared to average data to predict the emotional state of the user. For example, the biometric data may include data associated with the heart rate of the user. The heart rate of the user may be compared to an average heart rate. When it is determined that the heart rate of the user is greater than the average heart rate, the emotional state of the user may be predicted to be happy or excited. When it is determined that the heart rate of the user is less than the average heart rate, the emotional state of the user may be predicted to be sad. When it is determined that the heart rate of the user is within a threshold of the average heart rate, the emotional state of the user may be predicted to be normal, that is, the emotional state of the user is neither happy nor sad.

In one or more embodiments, the average data may be obtained by the server 130 via an application programming interface (API). For example, the server 130 may engage an API to obtain data associated with the user. The average data may be determined based on the data associated with the user. For example, the API may be an API associated with a health or fitness application resident on the first computing device 110. In this example, the data associated with the user may include the gender, age, height, etc. Using this information, an average heart rate for the user may be determined. For example, the user may be a forty (40) year old woman and as such the server 130 may determine the average heart rate for a forty (40) year old woman. The biometric data may be compared to the determined average to predict the emotional state of the user.

In one or more embodiments, historical or previously obtained biometric data of the user may be used. For example, the server 130 may store previously obtained biometric data associated with the heart rate of the user in memory and an average heart rate may be determined for the user using the previously obtained biometric data. The biometric data obtained during step 510 may be current biometric data indicating a current heart rate of the user. The current biometric data may be compared to the average heart rate determined using the previously obtained biometric data to predict the emotional state of the user.

The server 130 determines that the predicted emotional state of the user satisfies predefined criteria (step 530). In this embodiment, the predefined criteria includes one or more emotional states. For example, the predefined criteria may include determining that the predicted emotional state of the user is happy or excited. In another example, the predefined criteria may include determining that the predicted emotional state of the user is sad.

Responsive to determining that the predicted emotional state of the user satisfies the predefined criteria, the server 130 sends, via the communication module and to one or more devices, a signal causing the one or more devices to display an incentive based on the predicted emotional state (step 540). In this embodiment, the one or more devices include the first computing device 110 and/or the second computing device 120. The incentive may be provided through, for example, the incentive application resident on the first computing device 110 and/or the second computing device 120. The incentive may be displayed within the incentive application, over a lock-screen of the first computing device 110 and/or the second computing device 120 and/or may be displayed within a notification center associated with an operating system executing on the first computing device 110 and/or the second computing device 120.

The server 130 may select the one or more incentives to be sent to the user based on, for example, incentive data stored in memory. The incentive data may include data identifying the predefined criteria used during step 530 of method 500 and may include data identifying the incentive to be provided to the user, for example, a 20% discount. In embodiments where the server 130 is associated with a financial institution, the incentive data stored in memory may be based on one or more agreements between the financial institution and one or more partner merchants. For example, a partner merchant may request that the financial institution send an incentive to one or more particular users when the emotional state of the one or more users is predicted to be happy. In embodiments where the server 130 is associated with a merchant, the incentive data stored in memory may be defined by the merchant.

The incentive may include a one-time discount or offer to the user. For example, responsive to determining that the predicted emotional state of the user is happy, the incentive may include a discount of 20% for any items purchased at a particular merchant. The incentive may include a selectable option to accept the incentive and, responsive to the user selecting the selectable option via touch input on a display screen of the first computing device 110 or the second computing device 120, the first computing device 110 or the second computing device 120 may be directed to a website associated with the particular merchant. The user may select one or more items on the website for purchase. During online checkout, the incentive may be applied to the purchase price and as such the user may receive the discount. For example, the incentive may be automatically entered as a coupon code or discount code and as such the user may automatically receive the discount for their purchase. In this example, the one-time discount or offer to the user may include an expiration date or time. For example, the one-time discount or offer to the user may only be active for a period of one hour, one day, etc.

Figure 6:
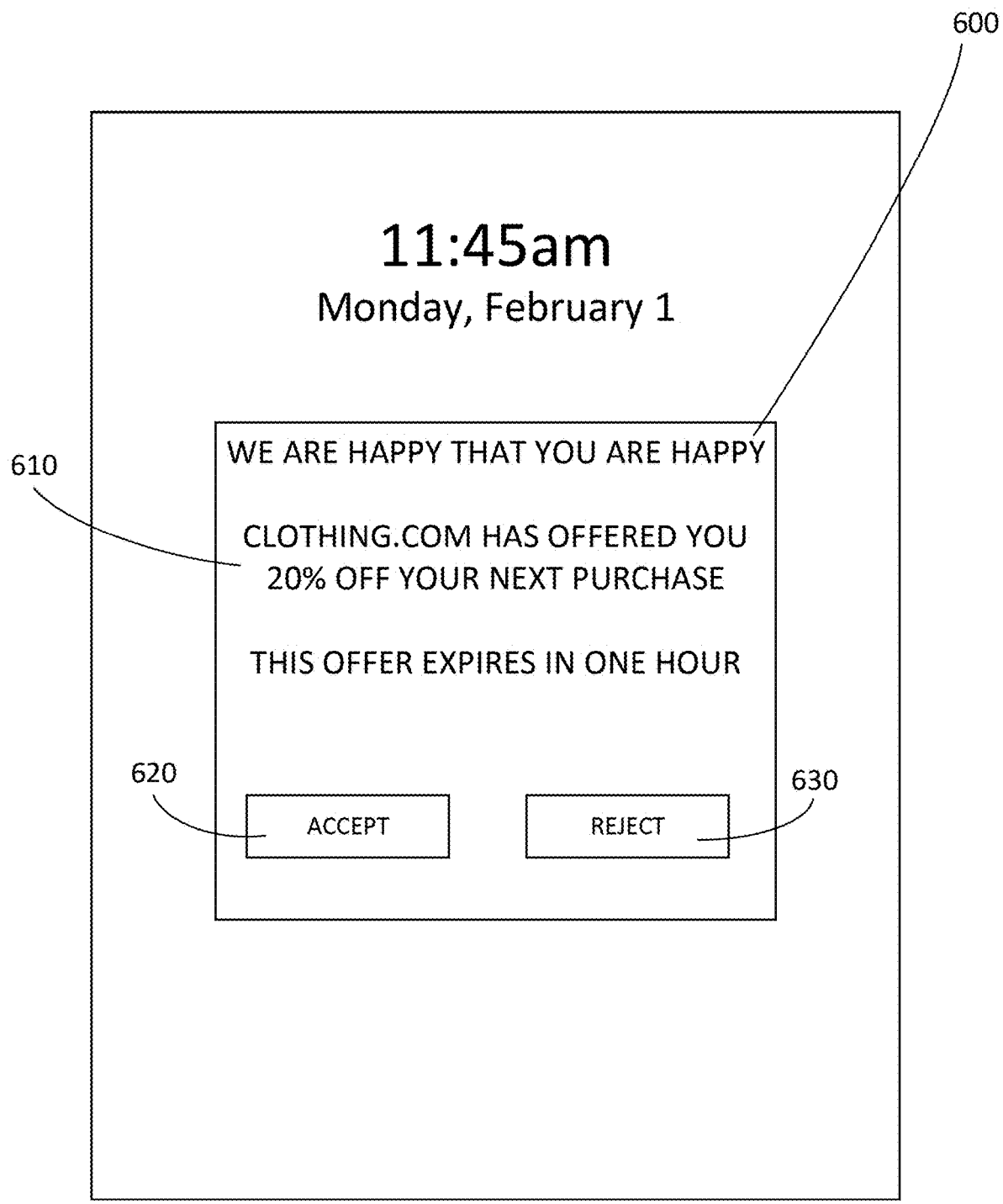
FIG. 6 is an example incentive displayed on a display screen of a computing device.

An example incentive displayed on a display screen of the second computing device 120 is shown in FIG. 6. As can be seen, the incentive is displayed within a graphical user interface (GUI) 600 that includes information 610 relating to the incentive. In this example, the information indicates the website associated with the incentive (clothing.com), the offer (20% off) and an expiry time for the incentive (one hour). The GUI 600 also includes a first selectable option 620 and a second selectable option 630. The user may select the first selectable option 620 to accept the incentive via touch input on the display screen of the second computing device 120 and may select the second selectable option 630 to reject the incentive via touch input on the display screen of the second computing device 120. Responsive to the user selecting the first selectable option 620, a signal is sent to the server 130 indicating that the user has accepted the incentive and the second computing device 120 is directed to a website associated with the merchant. As mentioned, the server 130 may cause the website to automatically apply the discount to a purchase made by the user on the website. For example, the server 130 may enter a coupon code or discount code and this may be applied to a purchase made on the website. Responsive to the user selecting the second selectable option 630, a signal is sent to the server 130 indicating that the user has rejected the incentive.

As mentioned, the incentive shown in FIG. 6 includes an expiry time (one hour). In the event that the user does not make a purchase on the website within an hour of receiving the incentive, the incentive will be revoked and the server 130 may send a signal to the second computing device 120 causing the second computing device 120 to display a notification indicating that the incentive has expired.

The one or more incentives may additionally or alternatively include a cash back offer for any purchases made. For example, an incentive may include a 3% cash back offer for any purchases made at the merchant.

Figure 7:
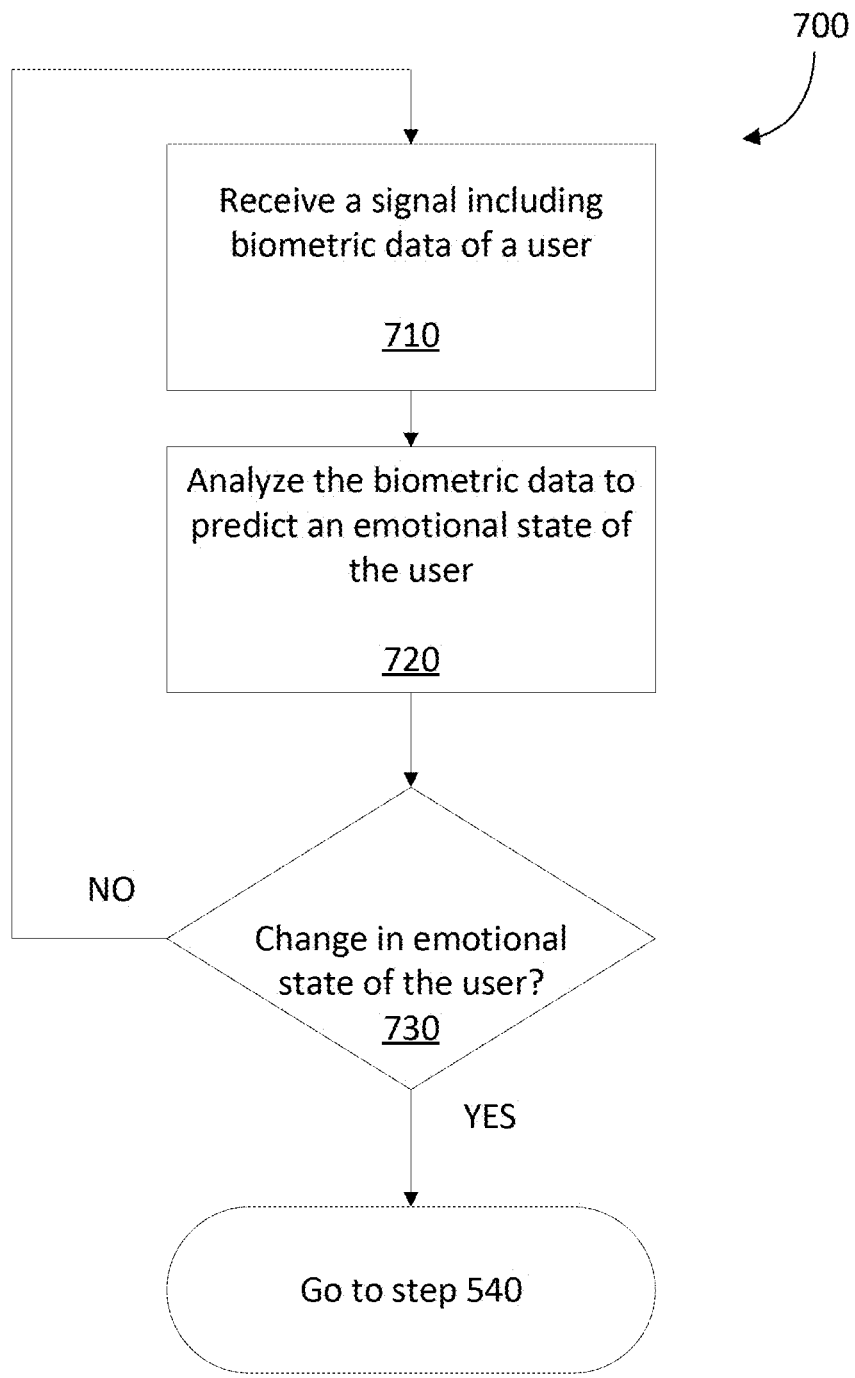
FIG. 7 is a flowchart showing operations performed by a server in determining a change in predicted emotional state of a user according to an embodiment.

In one or more embodiments, the steps of receiving (step 510) and analyzing (step 520) of method 500 may be repeated and this may be done according to a method 700. FIG. 7 is a flowchart showing operations of method 700 that may be performed by the server 130 according to an embodiment. For example, computer-executable instructions stored in memory of the server 130 may, when executed by one or more processors, configure the server 130 to perform the method 700 or a portion thereof.

During method 700, the steps of receiving (step 710) and analyzing (step 720) are performed in manners similar to steps 510 and 520 described above. A check is performed to determine if there is a change in the predicted emotional state of the user (step 730). For example, the most recently predicted emotional state of the user may be compared to a current predicted emotional state of the user to determine if there has been a change. If there has been no change in the predicted emotional state of the user, the method may return back to step 710 where additional biometric data may be received. The method 700 may be performed such that biometric data may be periodically received by the server 130, for example, every minute.

The server 130 may continue to receive and analyze the biometric data according to steps 710 and 720 until the predicted emotional state of the user has changed. Specifically, during step 730, the server 130 may determine that the current predicted emotional state of the user is different than the most recently predicted emotional state of the user. For example, the server 130 may determine that the predicted emotional state of the user has changed from normal to happy. Responsive to determining that the predicted emotional state of the user has changed, the method 700 may continue to step 540 of method 500 described above. In this manner, the incentive may be sent to the user in response to a change in predicted emotional state. For example, the predicted emotional state may change from normal to happy and this may trigger the server 130 to send the incentive to the first computing device 110 and/or second computing device 120.

Figure 8:
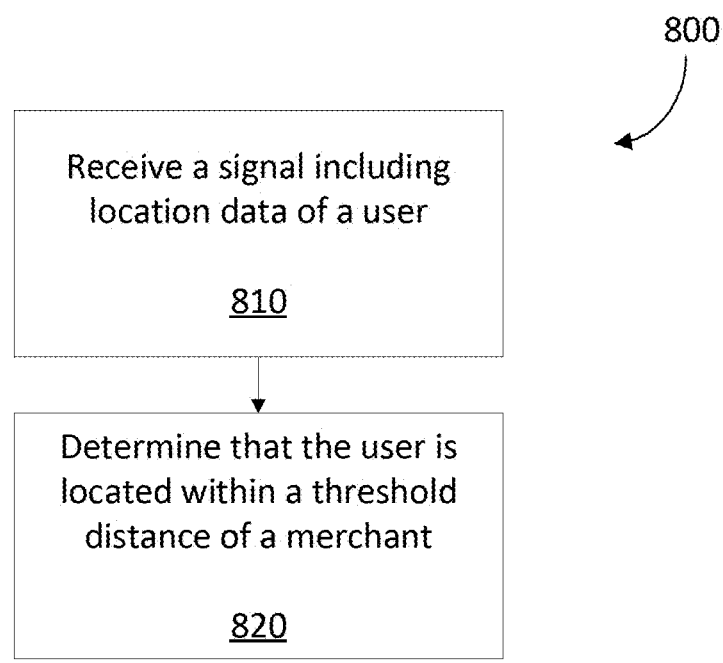
FIG. 8 is a flowchart showing operations performed by a server in determining that a user is within a threshold distance of a merchant according to an embodiment.

In one or more embodiments, incentives may be additionally based on location data. For example, the location of the user may be tracked and when it is determined that the user is located within a threshold distance of a merchant, the server 130 may perform method 500. FIG. 8 is a flowchart showing operations performed by the server 130 according to an embodiment. The operations may be included in a method 800 which may be performed by the server 130. For example, computer-executable instructions stored in memory of the server 130 may, when executed by one or more processors, configure the server 130 to perform the method 800 or a portion thereof.

The server 130 receives, via the communications module and from the first computing device 110 and/or the second computing device 120, a signal including location data of the user (step 810). In this embodiment, the first computing device 110 and/or the second computing device 120 may engage a location subsystem which generates location data indicating a location of the first computing device 110 and/or second computing device 120. The location may be the current geographic location of the first computing device 110 and/or second computing device 120. It will be appreciated that the location of the first computing device 110 and/or second computing device 120 is assumed to be the current geographic location of the user.

The server 130 determines that the user is within a threshold distance of a particular merchant (step 820). Using the location of the user, the server 130 determines if the user is within the threshold distance of a particular merchant. The particular merchant may be identified using, for example, a geographic location of the merchant. The threshold distance may be associated with a geofence representing a virtual boundary set up around the boundary of the geographic location of the merchant. The server 130 may engage one or more application programming interfaces (APIs) such as for example Google Maps API or Geofencing API. The threshold distance may be selected such that the server 130 determines that the user is located at the merchant. For example, the user may be inside a particular store.

Responsive to determining that the user is within the threshold distance of the particular merchant, the server 130 may perform methods described herein to send biometric data based incentives. In this manner, the merchant may send an incentive to the first computing device 110 and/or second computing device 120 when the user is visiting the merchant and when the predicted emotional state of the user satisfies the predefined criteria. Specifically, when it is determined that the user is located within the threshold distance of the particular merchant, the server 130 may obtain biometric data and may send biometric data based incentives to the first computing device 110 and/or second computing device 120 while the user is located at the merchant. The biometric data based incentives may include, for example, a discount that may be applied to a purchase made at the merchant.

In one or more embodiments, the incentive may not be valid or eligible to be used when it is determined that the user has left the merchant without using the incentive. For example, based on the location data, the server 130 may determine that the location of the user is outside of the threshold distance of the particular merchant. Responsive to determining that the location of the user is outside the threshold distance of the particular merchant and that the incentive has not been used, the server 130 may send a signal causing the first computing device 110 and/or the second computing device 120 to display a notification indicating that the incentive is no longer valid or eligible to be used.

Figure 9:
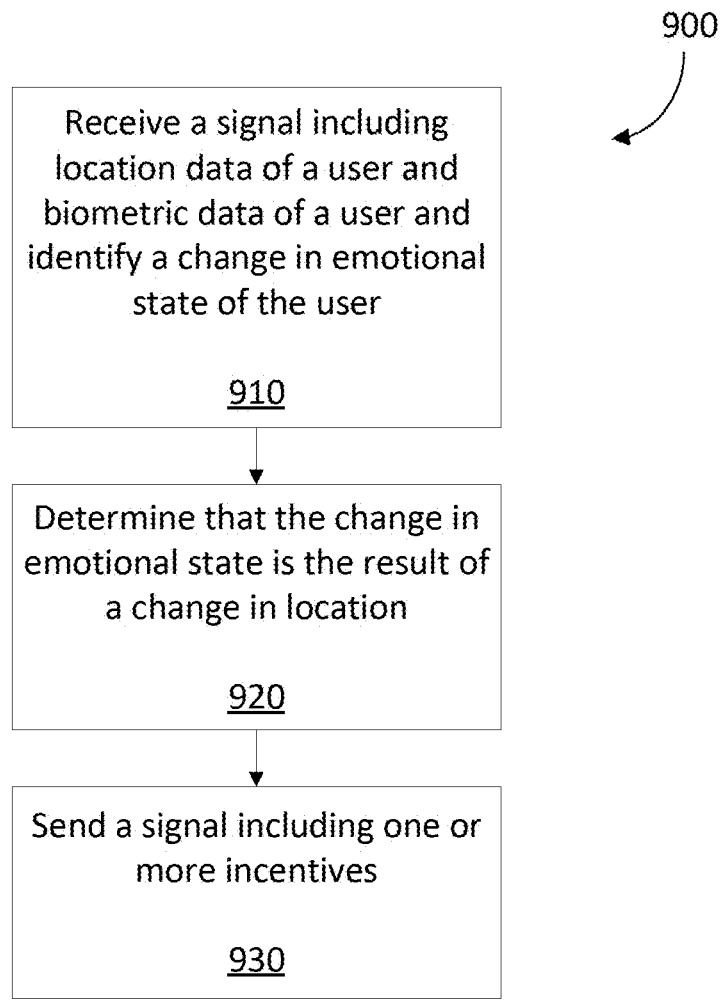
FIG. 9 is a flowchart showing operations performed by a server in sending biometric data based incentives according to an embodiment.

Although in embodiments the location data is received by the server 130 prior to the server 130 receiving biometric data, in one or more embodiments, location data and biometric data may be received and analyzed by the server 130. For example, location data and biometric data may be obtained by the server 130 and the server 130 may analyze the location data and the biometric data to send incentives to the user. FIG. 9 is a flowchart showing operations performed by the server 130 according to an embodiment. The operations may be included in a method 900 which may be performed by the server 130. For example, computer-executable instructions stored in memory of the server 130 may, when executed by one or more processors, configure the server 130 to perform the method 900 or a portion thereof.

The server 130 receives, via the communications module and from the first computing device 110 and/or the second computing device 120, a signal including location data identifying a location of the user and a signal including biometric data of the user and analyzes the biometric data to identify a change in the emotional state of the user (step 910). This may be done in a manner similar to that described herein with reference to method 700.

The server 130 determines that the change in emotional state is the result of a change in location of the user (step 920). In this embodiment, the server 130 analyzes the location data to determine that the user is located within a threshold distance of a particular merchant similar to that described herein with reference to method 800.

When it is determined that the predicted emotional state of the user has changed approximately at the same time the location data indicates that the user is within the threshold distance of the particular merchant, the server 130 determines that the change in emotional state is the result of the change in location of the user.

The server 130 sends, via the communications module and to the first computing device 110 and/or second computing device 120, a signal including the one or more incentives (step 930). This may be done in a manner similar to that described herein with reference to method 500.

In this manner, one or more incentives may be sent to the user when it is determined that the change in the predicted emotional state of the user is a result of a change in location of the user. For example, the predicted emotional state of the user may change from normal to happy when the user enters a particular store and this may trigger the server 130 to send the incentive to the first computing device 110 and/or second computing device 120.

When it is determined that the change in the predicted emotional state of the user is a result of a change in location of the user, the server 130 may store this information for further use. For example, the server 130 may determine that the user is happy when they enter a coffee shop and this information may be stored. The next time the user enters a coffee shop, the server 130 may send an incentive to the user.

Figure 10:
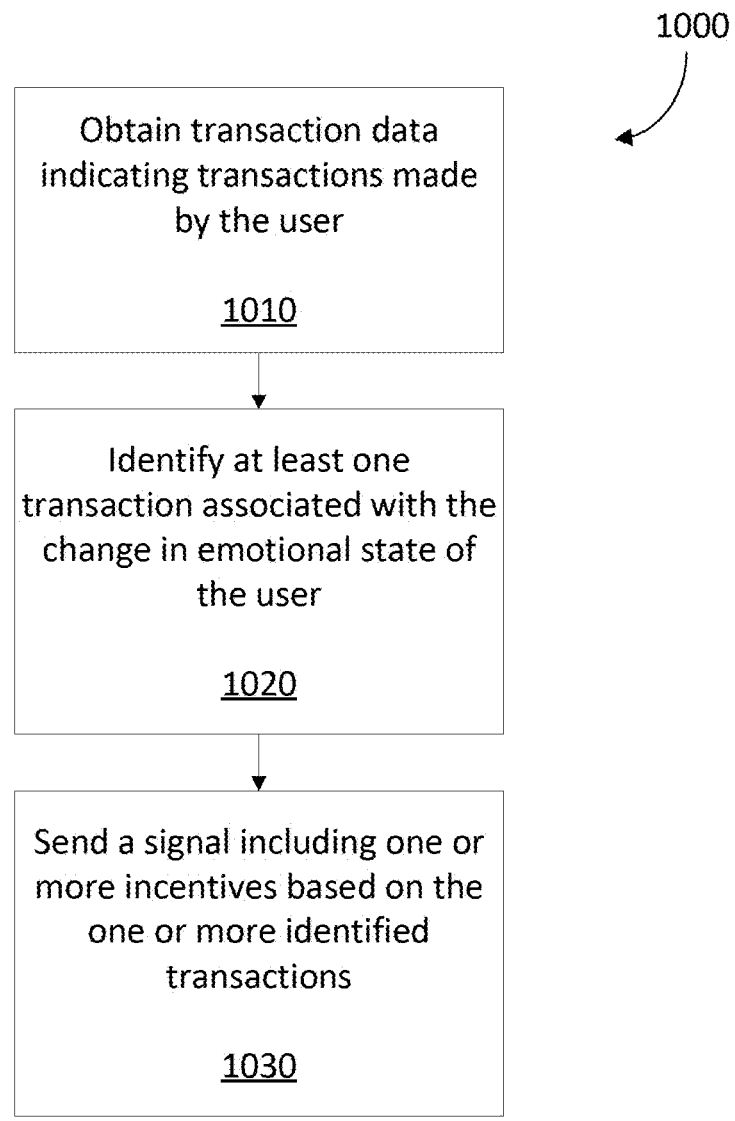
FIG. 10 is a flowchart showing operations performed by a server in sending one or more incentives according to an embodiment.

As mentioned, the server 130 may be associated with a financial institution and may maintain a database that includes various data records such as for example transaction data indicating transactions made by a user. In one or more embodiments, incentives may be additionally be based on transaction data. For example, the predicted change in emotional state of the user may be in response to a particular transaction and the one or more incentives may be sent based on the particular transaction. FIG. 10 is a flowchart showing operations performed by the server 130 according to an embodiment. The operations may be included in a method 1000 which may be performed by the server 130. For example, computer-executable instructions stored in memory of the server 130 may, when executed by one or more processors, configure the server 130 to perform the method 1000 or a portion thereof. At least portions of the method 1000 may be performed by server 130 in response to the server 130 determining a change in the predicted emotional state of the user according to methods described herein.

The server 130 obtains transaction data indicating transactions made by the user (step 1010). In this embodiment, the server 130 may obtain the transaction data from the database maintained thereby. In one or more embodiments where the server 130 is not associated with a financial institution, the server 130 may engage an API to obtain transaction data from a financial institution.

The transaction data may include information such as for example the name of a merchant where a purchase was made and information relating to the one or more items purchased. For example, the user may have purchased concert tickets via a ticket website and as such the transaction data may include the name of the website where the tickets were purchased. The information may also identify a date and a time for when the concert takes place.

The server 130 identifies at least one transaction associated with the change in the predicted emotional state of the user (step 1020). The server 130 may analyze the transaction data to determine if any transactions are associated with the change in the predicted emotional state of the user. For example, a transaction may have been processed at approximately the same time the change in the predicted emotional state of the user changed from normal to happy and as such the server 130 determines that the transaction is associated with the change in the predicted emotional state. As another example, the transaction data may identify a time and a date for a particular event such as a concert. The change in the predicted emotional state of the user may be during the concert and as such the transaction associated with purchasing the concert tickets is identified by the server 130.

The server 130 sends, via the communications module and to the first computing device 110 and/or second computing device 120, a signal including one or more incentives based on the one or more identified transactions (step 1030). In this embodiment, the one or more incentives are based on the one or more identified transactions. For example, where the identified transaction is associated with purchasing concert tickets, the server 130 determines that the user is interested in going to concerts and as such the one or more incentives may be based on purchasing concert tickets. For example, the incentive may offer a 3% cash back to the user for any concert tickets purchased on a particular credit card of the user. As another example, where the identified transaction is associated with a particular restaurant or a particular merchant, the one or more incentives may be based on the particular restaurant or the particular merchant.

Figure 11:
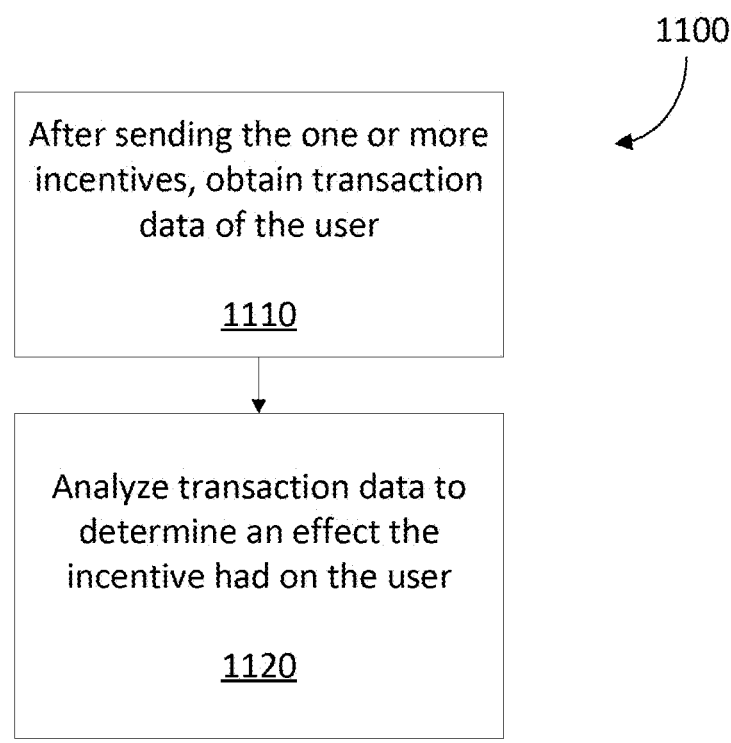
FIG. 11 is a flowchart showing operations performed by a server in analyzing transaction data to determine an effect the incentive had on a user according to an embodiment.

The transaction data may additionally or alternatively be analyzed by the server 130 to determine if the one or more incentives resulted in the processing of a transaction. FIG. 11 is a flowchart showing operations performed by the server 130 according to an embodiment. The operations may be included in a method 1100 which may be performed by the server 130. For example, computer-executable instructions stored in memory of the server 130 may, when executed by one or more processors, configure the server 130 to perform the method 1100 or a portion thereof. At least portions of the method 1100 may be performed by server 130 in response to the server 130 sending the one or more incentives to the user according to methods described herein.

After sending the one or more incentives, the server 130 obtains transaction data of the user (step 1110). In this embodiment, the server 130 may obtain transaction data in a manner similar to that described with reference to method 1000.

The server 130 analyzes the transaction data to determine an effect an incentive had on the user (step 1120). In this embodiment, the server 130 may analyze the transaction data to identify a transaction associated with the incentive. For example, the incentive may be for a particular merchant and as such a transaction may be identified that was made at the particular merchant at a time after the incentive was sent. The server 130 may compare the identified transaction to previous transactions made by the user at the particular merchant to determine if the incentive resulted in an increase in spend by the user to. The server 130 may additionally or alternatively compare the identified transaction to an average transaction amount made at the merchant (by all customers) to determine if the incentive resulted in an increase spend.

Figure 12:
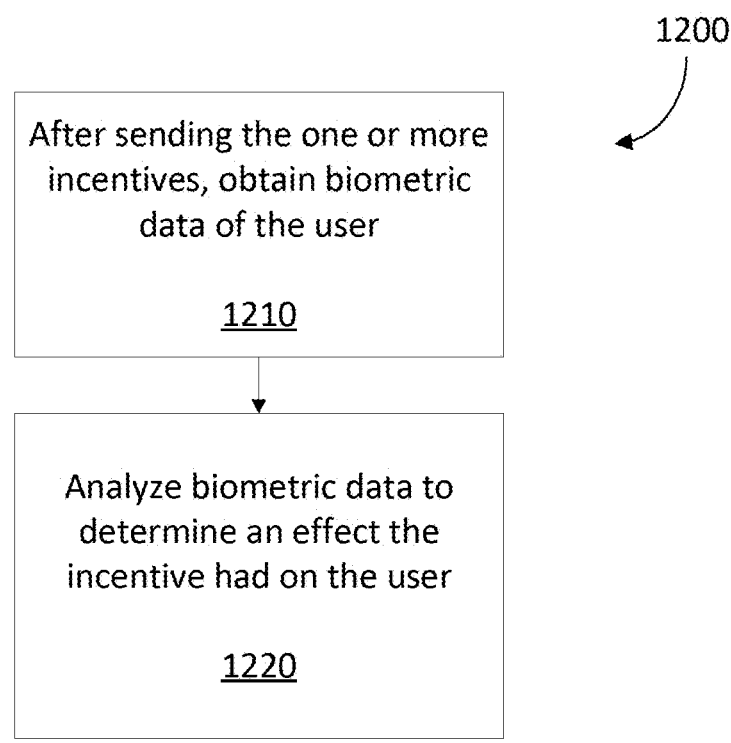
FIG. 12 is a flowchart showing operations performed by a server in analyzing biometric data to determine an effect the incentive had on a user according to an embodiment.

The biometric data may additionally or alternatively be analyzed by the server 130 to determine an effect an incentive had on the user. FIG. 12 is a flowchart showing operations performed by the server 130 according to an embodiment. The operations may be included in a method 1200 which may be performed by the server 130. For example, computer-executable instructions stored in memory of the server 130 may, when executed by one or more processors, configure the server 130 to perform the method 1200 or a portion thereof. At least portions of the method 1200 may be performed by server 130 in response to the server 130 sending the one or more incentives to the user according to methods described herein.

After sending the one or more incentives, the server 130 obtains biometric data of the user (step 1210). In this embodiment, the server 130 may obtain biometric data in a manners similar to that described herein.

The server 130 analyzes the biometric data to determine an effect the incentive had on the user (step 1220). In this embodiment, the server 130 may analyze the biometric data to determine if the incentive resulted in a change in the predicted emotional state of the user. For example, the incentive may have been sent to the user in response to the server 130 determining that the user was sad. The server 130 may determine that the incentive resulted in the predicted emotional state of the user changing from sad to happy.

The effect the incentive had on the user may be used by the server 130 to better select and provide incentives. Specifically, the server 130 may engage an artificial intelligence component to select the one or more incentives to be sent to the user. The artificial intelligence component may be trained to select the one or more incentives using previous data from previous transactions and/or corresponding predicted emotional states. For example, the artificial intelligence component may be trained using data obtained by the server 130 during methods 1100 and 1200 described herein. In this manner, the server 130 may better determine which incentive to provide to the user and when to provide the incentive to the user. For example, the artificial intelligence component may determine that an incentive of a 10% discount may have no effect on the predicted emotional state of the user but an incentive of a 20% discount may have an effect on the predicted emotional state of the user and thus is more likely to result in an increased spend by the user at the particular merchant.

Although in embodiments the predicted emotional state of the user is based on biometric data obtained by the first computing device 110 and/or the second computing device 120, additional or alternative types of data may be used. For example, a microphone associated with the first computing device 110 and/or the second computing device 120 may obtain audio data of the user. The server 130 may analyze the audio data to predict an emotional state of the user. For example, when a volume of the user's voice goes above a threshold level the server 130 may determine that the predicted emotional state of the user is happy or excited. As another example, a merchant may place a number of microphones within their store and these microphones may be used to obtain audio data of one or more users visiting the merchant. The audio data may be analyzed by the server 130 to predict an emotional state of the one or more users.

It will be appreciated that the one or more incentives sent to the first computing device 110 and/or the second computing device 120 may sent by the server 130 in a number of ways. For example, the server 130 may send the incentives through the incentive application, via Bluetooth, via email, via text message, etc.

The one or more incentives may be used by the user during checkout. For example, as described above, the server 130 may apply the one or more incentives during an online checkout process. As another example, the user may present the one or more incentives during checkout at a physical store of the merchant and the one or more incentives may be applied to the purchase.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer server system comprising:
a communications module;
a processor coupled with the communications module; and
a memory coupled to the processor and storing processor-executable instructions which, when executed by the processor, configure the processor to:
periodically receive, via the communications module and from one or more devices, a signal including current biometric data of a user;
analyze the current biometric data to predict a current emotional state of the user;
compare the predicted current emotional state of the user to a last predicted current emotional state of the user to determine a change in the emotional state of the user;
generate an incentive from a merchant based on the predicted emotional state of the user and set an expiry of the incentive;
responsive to determining the change in the emotional state of the user, send, via the communications module to the one or more devices, a signal causing the one or more devices to display a graphical user interface that includes the incentive, the expiry of the incentive and a selectable option to accept the incentive; and prior to the expiry of the incentive:
receive, via the communications module and from one of the devices, a signal indicating selection of the selectable option to accept the incentive;
responsive to receiving the signal indicating selection of the selectable option to accept the incentive, send, via the communications module and to at least one of the devices, a signal directing the at least one of the devices from the graphical user interface to a website associated with the merchant such that the incentive is automatically entered as a coupon code and applied during an online checkout on the website associated with the merchant;
obtain transaction data for a transaction made using the incentive on the website associated with the merchant; and
compare the transaction data for the transaction to transaction data for one or more previous transactions to determine that the incentive resulted in an increase in spend; and
responsive to determining that the incentive resulted in the increase in spend, include the predicted emotional state of the user, the generated incentive, and the transaction data in a training data set for an artificial intelligence component.

2. The system of claim 1, wherein the processor-executable instructions, when executed by the processor, further configure the processor to:
receive, via the communications module and from the one or more devices, a signal including location data identifying a location of the user;
determine that the change in emotional state is a result of a change in location of the user; and
responsive to determining that the change in emotional state is the result of the change in location of the user, send the signal including the one or more incentives.

3. The system of claim 1, wherein the processor-executable instructions, when executed by the processor, further configure the processor to:
obtain, via the communications module and from a server, transaction data indicating transactions made by the user; and
identify at least one transaction associated with the change in the emotional state of the user, wherein the one or more incentives are further based on the identified transaction.

4. The system of claim 1, wherein, when analyzing the biometric data to predict the emotional state of the user, the processor-executable instructions further configure the processor to:
engage an application programming interface to obtain data associated with the user;
determine at least one average value based on the data associated with the user; and
compare the biometric data to the at least one average value to predict the emotional state of the user.

5. The system of claim 1, wherein, when analyzing the biometric data to predict the emotional state of the user, the processor-executable instructions further configure the processor to:
store the biometric data in memory; and
compare current biometric data to previously obtained biometric data of the user to predict the emotional state of the user.

6. The system of claim 1, wherein the processor-executable instructions, when executed by the processor, further configure the processor to:
receive, via the communications module and from the one or more devices, a signal including location data indicating a location of the user;
wherein the one or more incentives are further based on the location of the user.

7. The system of claim 1, wherein the processor-executable instructions, when executed by the processor, further configure the processor to:
after providing the one or more incentives to the user, receive a signal including additional biometric data of the user; and
analyze the additional biometric data to determine an effect the one or more incentives had on the emotional state of the user.

8. The system of claim 1, wherein the processor-executable instructions, when executed by the processor, further configure the processor to:
after providing the one or more incentives to the user, obtain transaction data of the user; and
analyze the transaction data to determine an effect the one or more incentives had on the emotional state of the user.

9. The system of claim 1, wherein the processor-executable instructions, when executed by the processor, further configure the processor to:
engage the artificial intelligence component to select the one or more incentives to be provided to the user, the artificial intelligence component trained to select the one or more incentives using previous transaction data from previous transactions and corresponding predicted emotional states.

10. A computer-implemented method of providing incentives to a user, the method comprising:
periodically receiving, via a communications module and from one or more devices, a signal including current biometric data of a user;
analyzing the current biometric data to predict a current emotional state of the user;
comparing the predicted current emotional state of the user to a last predicted current emotional state of the user to determine a change in the emotional state of the user;
generating an incentive from a merchant based on the predicted emotional state and setting an expiry of the incentive;
responsive to determining the change in the emotional state of the user, sending, via the communications module and to the one or more devices, a signal causing the one or more devices to display a graphical user interface that includes the incentive, the expiry of the incentive and a selectable option to accept the incentive; and
prior to the expiry of the incentive:
receiving, via the communications module and from one of the devices, a signal indicating selection of the selectable option to accept the incentive; and
responsive to receiving the signal indicating selection of the selectable option to accept the incentive, sending, via the communications module and to at least one of the devices, a signal directing the at least one of the devices from the graphical user interface to a website associated with the merchant such that the incentive is automatically entered as a coupon code and applied during an online checkout on the website associated with the merchant;
obtaining transaction data for a transaction made using the incentive on the website associated with the merchant;

comparing the transaction data for the transaction to transaction data for one or more previous transactions to determine that the incentive resulted in an increase in spend; and responsive to determining that the incentive resulted in the increase in spend, including the predicted emotional state of the user, the generated incentive, and the transaction data in a training data set for an artificial intelligence component.

11. The computer-implemented method of claim 10, further comprising:

receiving, via the communications module and from the one or more devices, a signal including location data identifying a location of the user;

determining that the change in emotional state is a result of a change in location of the user; and responsive to determining that the change in emotional state is the result of the change in location of the user, providing the signal including the one or more incentives.

12. The computer-implemented method of claim 10, further comprising:

obtaining, via the communications module and from a server, transaction data indicating transactions made by the user; and identifying at least one transaction associated with the change in the emotional state of the user, wherein the one or more incentives are further based on the identified transaction.

13. The computer-implemented method of claim 10, wherein analyzing the biometric data to predict the emotional state of the user comprises:

engaging an application programming interface to obtain data associated with the user;

determining at least one average value based on the data associated with the user; and comparing the biometric data to the at least one average value to predict the emotional state of the user.

14. The computer-implemented method of claim 10, wherein analyzing the biometric data to predict the emotional state of the user comprises:

storing the biometric data in memory; and comparing current biometric data to previously obtained biometric data of the user to predict the emotional state of the user.

15. The computer-implemented method of claim 10, further comprising:

receiving, via the communications module and from the one or more devices, a signal including location data indicating a location of the user;

wherein the one or more incentives are further based on the location of the user.

16. The computer-implemented method of claim 10, further comprising:

after providing the one or more incentives to the user, obtaining transaction data of the user; and analyzing the transaction data to determine an effect the one or more incentives had on the emotional state of the user.

17. The computer-implemented method of claim 10, further comprising:

engaging the artificial intelligence component to select the one or more incentives to be provided to the user, the artificial intelligence component trained to select the one or more incentives using previous transaction data from previous transactions and corresponding predicted emotional states.

18. A non-transitory computer readable storage medium comprising computer-executable instructions which, when executed, configure a processor to:

periodically receive, via a communications module and from one or more devices, a signal including current biometric data of a user;

analyze the current biometric data to predict a current emotional state of the user;

compare the predicted current emotional state of the user to a last predicted current emotional state of the user to determine a change in the emotional state of the user;

generate an incentive from a merchant based on the predicted emotional state of the user and set an expiry of the incentive;

responsive to determining the change in the emotional state of the user, send, via the communications module and to the one or more devices, a signal causing the one or more devices to display a graphical user interface that includes the incentive, the expiry of the incentive and a selectable option to accept the incentive; and prior to the expiry of the incentive:

receive, via the communications module and from one of the devices, a signal indicating selection of the selectable option to accept the incentive;

responsive to receiving the signal indicating selection of the selectable option to accept the incentive, send, via the communications module and to at least one of the devices, a signal directing the at least one of the devices from the graphical user interface to a website associated with the merchant such that the incentive is automatically entered as a coupon code and applied during an online checkout on the website associated with the merchant;

obtain transaction data for a transaction made using the incentive on the website associated with the merchant;

compare the transaction data for the transaction to transaction data for one or more previous transactions to determine that the incentive resulted in an increase in spend; and responsive to determining that the incentive resulted in the increase in spend, include the predicted emotional state of the user, the generated incentive, and the transaction data in a training data set for an artificial intelligence component.

* * * * *